United States Patent [19]

Ikeda et al.

[11] Patent Number: 5,931,428
[45] Date of Patent: Aug. 3, 1999

[54] BRACKET FOR CLAMPING A MEASURING INSTRUMENT AND STAND FOR SUPPORTING THE SAME

[75] Inventors: Mamoru Ikeda, Kure, Japan; Hirotaka Ishida, Lerma, Mexico

[73] Assignee: Mitutoyo Corporation, Kawasaki, Japan

[21] Appl. No.: 08/993,179

[22] Filed: Dec. 18, 1997

[30] Foreign Application Priority Data

Dec. 27, 1996 [JP] Japan .................................. 8-350017

[51] Int. Cl.⁶ .................................................. F16B 1/00
[52] U.S. Cl. .......................................... 248/230.1; 248/674
[58] Field of Search ............................ 248/230.1, 229.24, 248/230.3, 230.5, 230.2, 231.61, 124.2, 674; 463/385

[56] References Cited

U.S. PATENT DOCUMENTS

| | | | |
|---|---|---|---|
| 1,561,432 | 11/1925 | Hitchcock | 248/230.2 |
| 2,958,110 | 11/1960 | McBrien | 403/188 |
| 3,167,292 | 1/1965 | Meyerowitz | 248/230.1 |
| 3,484,066 | 12/1969 | Aunspaugh | 248/541 |
| 3,581,354 | 6/1971 | Usiskin | 248/569 |
| 3,749,345 | 7/1973 | Luder et al. | 248/230.2 |
| 4,402,481 | 9/1983 | Sasaki | 248/276.1 |
| 4,671,477 | 6/1987 | Cullen | 248/122.1 |
| 4,735,386 | 4/1988 | Richards | 248/62 |
| 4,858,860 | 8/1989 | Richards | 248/62 |
| 4,878,644 | 11/1989 | Downing | 248/674 |
| 5,017,038 | 5/1991 | Kurosaki | 403/385 |

*Primary Examiner*—Derek J. Berger
*Assistant Examiner*—Anita M. King
*Attorney, Agent, or Firm*—Oliff & Berrridge, PLC

[57] ABSTRACT

A first clamping portion for clamping a stem of a dial gauge and a second clamping portion for clamping a pole of a stand are provided in a bracket body. The clamping portions are respectively composed of supporting holes; clamping screws which are screwed in a direction perpendicular to the axes of the supporting holes; and clamping tops pressed toward the inside of the supporting holes by the movement of the clamping screws in the axis direction with screwing the clamping screws.

17 Claims, 6 Drawing Sheets

BRACKET FOR CLAMPING A MEASURING INSTRUMENT AND STAND FOR SUPPORTING THE SAME

BACKGROUND OF THE INVENTION

1. Field of the Invention

This invention relates to a bracket for clamping a measuring instrument and a stand for supporting a measuring instrument. More specifically, this invention relates to the bracket for clamping the measuring instrument, such as an indicator and a dial gauge, and the stand for supporting the measuring instrument, in which the bracket for clamping the measuring instrument is used.

2. Description of the Related Art

As a stand for supporting a measuring instrument such as an indicator and a dial gauge, an articulated type stand (see U.S. Pat. No. 4,402,481), mainly used for the indicator, and a straight-pole type stand mainly used for the dial gauge are known.

Figure 5:
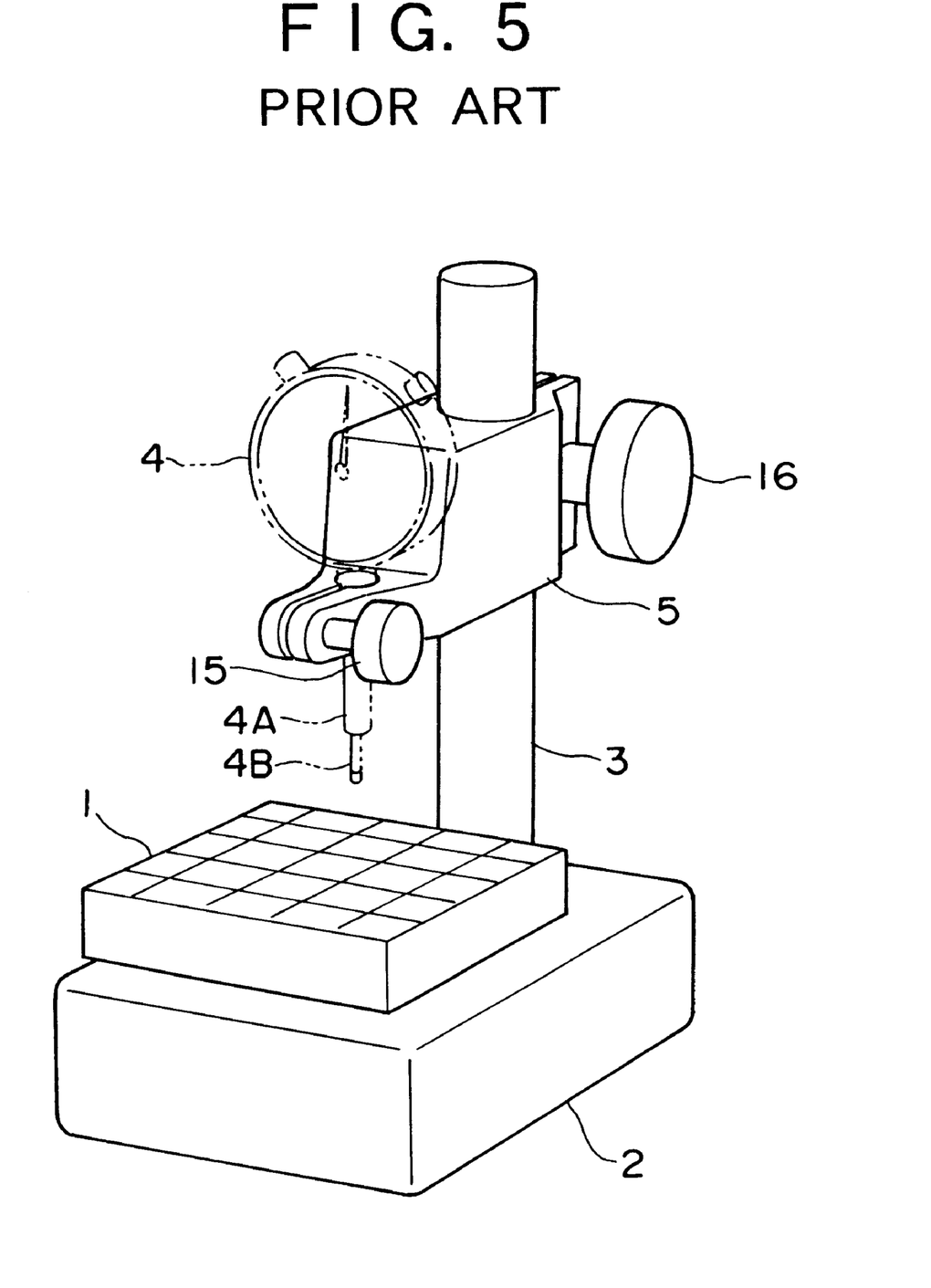
FIG. 5 is a perspective view showing a conventional stand.

As shown in FIG. 5, for example, the straight-pole type stand used for the dial gauge is composed of a base 2 having a measuring area 1 on the surface thereof, a cylindrical pole 3 standing up on the base 2, and a bracket 5 which is rotatably and vertically movably fixed to the pole 3 and holds a dial gauge 4 as a measuring instrument at the end thereof.

Figure 6:
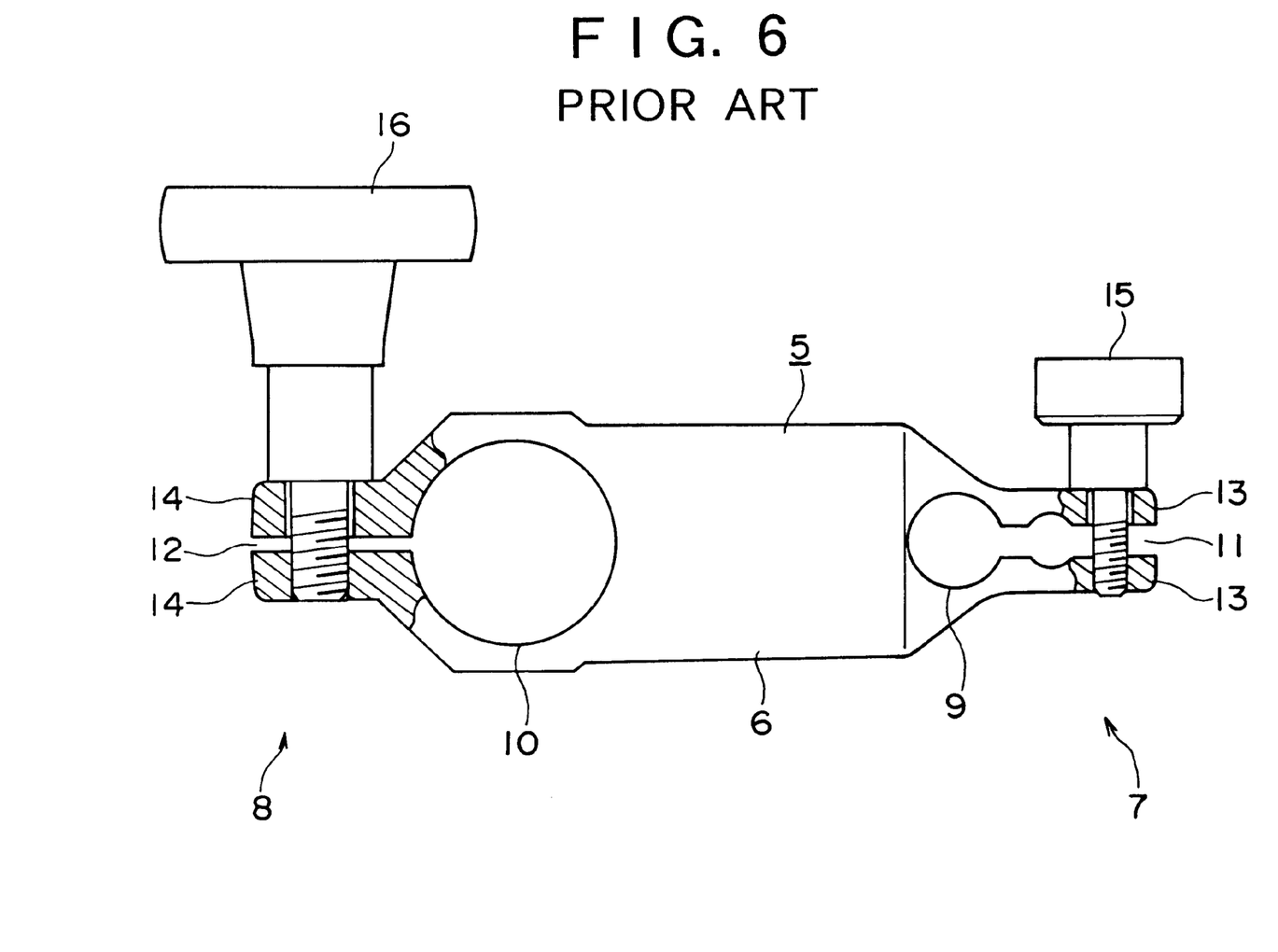
FIG. 6 is a plane cutaway view showing a bracket of the conventional stand.

As shown in FIG. 6, the bracket 5 is, in turn, composed of: a bracket body 6; an attachment portion for the measuring instrument provided on one end of the bracket body 6, that is to say a first clamping portion 7 for clamping a stem 4A of the dial gauge 4 to the bracket 6; and a second clamping portion 8 provided on the other end of the bracket body 6 to clamp the bracket body 6 to the pole 3.

The clamping portions 7 and 8 are respectively composed of supporting holes 9 and 10; slots 11 and 12 extended from each part of the supporting holes 9 and 10 toward the ends of the bracket body 6; and adjusting knobs 15 and 16 for respectively causing two pairs of directly opposite pinch-fingers 13 and 14 between the slots 11 and 12 to be elastically deformed to move toward each other.

In the use, after the height of the bracket 5 is adjusted along the pole 3, the adjusting knob 16 is tightened to fix the bracket 5 to the pole 3. The stem 4A of the dial gauge 4 is inserted into the supporting hole 9 of the first clamping portion 7 of the bracket 5, and the bearing and the height of the dial gauge 4 is adjusted. After that, the adjusting knob 15 is tightened to fix the dial gauge 4 to the bracket 5. In this state, a spindle 4B of the dial gauge 4 is once lifted up, and a work (an object) to be measured is placed on the measuring area 1. After that, the spindle 4B is lowered down to abut the work measured. At this time, the height of the work to be measured is read from the dial gauge 4.

In the designed stand as described above, however, the structures of the first clamping portion 7, fixing the stem 4A of the dial gauge 4 to the bracket 5, and the second clamping portion 8 fixing the bracket 5 to the pole 3 are based on a clamping and fixing method, so that the positioning relation to one another, during the actual process for attaching is difficult to maintain.

More specifically, the aforementioned structure is the clamping method, in which when the stem 4A of the dial gauge 4 or the pole 3 is inserted into the supporting hole 9 or 10 and the adjusting knob 15 or 16, a pair of pinch-fingers 13 or 14, of which the fingers are opposite to each other to place the slot 11 or 12 between the fingers, is elastically deformed to move toward each other, thereby the diameter of the supporting hole 9 or 10 becomes smaller and then the stem 4A of the dial gauge 4 or the pole 3 is clamped. Therefore, while the diameter of the supporting hole 9 or 10 is getting smaller, the positioning relation to one another, namely, the positioning relation between the bracket 5 and the dial gauge 4 or the positioning relation between the pole 3 and the bracket 5, is easily deviated.

In the clamping and fixing method using the slots 11 and 12, the accuracy of the supporting holes 9 and 10, such as a diameter, a square angle and configuration, is not easy to obtain in producing, so that the supporting hole easily has play causing a rattle after the clamping process.

It is a work of the present invention to solve the aforementioned disadvantages and provide a bracket for clamping a measuring instrument and a stand for supporting the measuring instrument at low costs, in which the positions of parts are not deviated in clamping the measuring instrument, and a supporting hole rarely has play causing a rattle after a clamping process.

SUMMARY OF THE INVENTION

A bracket for clamping a measuring instrument of the present invention, which is provided with a clamping portion for clamping an attachment portion of the measuring instrument in a bracket body, is characterized by the clamping portion which has a supporting hole provided in the bracket body to insert the attachment portion of the measuring instrument therein; a clamping screw screwed adjacent to the supporting hole in a direction perpendicular to the axis of the supporting hole; and a pressing portion pressed toward the inside of the supporting hole by the movement of the clamping screw in the axis direction with screwing the clamping screw.

For the aforementioned structure, after the attachment portion of the measuring instrument is inserted into the supporting hole, the clamping screw is screwed. While the clamping screw is being screwed, it is moving in the axis direction. Thereby, the pressing portion presses against the inside of the supporting hole, therefore the pressing portion tightens the attachment portion of the measuring instrument inserted into the supporting hole. At this time, the diameter of supporting hole is not changed, so that the positioning relation between the bracket and the measuring instrument is not also changed.

It is unnecessary to form a slot of a conventional stand, thereby reducing the number of producing processes and production costs. The needlessness of the slot effects the continuous accuracy of the supporting hole, so that play causing a rattle is rarely produced, and additionally, tolerance control in the above inserted portions is easily carried out and the appropriate combination is allowed, thereby securely clamping with small force.

Another bracket for clamping a measuring instrument of the present invention, which is provided with a first clamping portion for clamping an attachment portion of the measuring instrument and a second clamping portion for clamping a supporting member for the measuring instrument in a bracket body, is characterized by: the first clamping portion which has a supporting hole provided in the bracket body to insert the attachment portion of the measuring instrument therein, a clamping screw screwed adjacent to the supporting hole in a direction perpendicular to the axis of the supporting hole, and a pressing portion pressed toward the supporting hole by the movement of the clamping screw in the axis direction with screwing the clamping screw; and the second clamping portion which has a supporting hole provided in the bracket body to insert the supporting member for the measuring instrument therein, a clamping screw screwed adjacent to the supporting hole in a direction perpendicular to the axis of the supporting hole, and a pressing portion pressed toward the inside of the supporting hole by the screwing and the movement of the clamping screw in the axis direction. In this point, the supporting member for the measuring instrument is what the measuring instrument is supported in proper attitude, such as a stand for supporting a measuring instrument.

With the above structure, the measuring instrument is supported in the proper position and attitude by the supporting member for the measuring instrument not to deviate from the required position and not to have play causing a rattle after the clamping process.

Concerning the aforementioned description, the pressing portion may be made in combination with or separately from the clamping screw.

As the manner for forming the pressing portion in combination with the clamping screw, a bulging portion, having a longer diameter than these of other parts, can be formed at some midpoint of the clamping screw to be pressed toward the supporting hole by the movement of the clamping screw in the axial direction with screwing the clamping screw.

On the other hand, as a manner for making the pressing portion separately from the clamping screw, the pressing portion can be provided to be protrude inward and draw back from the supporting hole, and additionally, the tapered portion or the like, abutting the pressing portion, can be formed at some midpoint of the clamping screw. Thereby, the pressing portion abutted to the tapered portion is pressed toward the inside of the supporting hole when the clamping screw is screwed and moved in the axial direction.

Alternatively, the clamping top, made separately from the clamping screw, may be fastened on the outer circumferential of the clamping screw with a set-screw or the like. The clamping top, made separately from the clamping screw, may be provided to rotate around the clamping screw but to control to move in the axial direction. When the clamping top is provided to rotate around the clamping screw while being controlled to move in the axial direction, the clamping top does not rotate although the clamping screw is rotated, so that the clamping top is left to press the attachment portion of the measuring instrument or the supporting member for the measuring instrument without sliding.

In the above state, it is advisable that the outer circumferential face of the clamping top has a rotation-quadric-surface (a curved surface that is formed by rotating a quadratic curve around any given axis) formed when the circular face of the supporting hole turns around the axis of the clamping screw.

The reason that the outer circumferential face of the clamping top is formed to have the rotation-quadric-surface as described above is that the clamping top get linear-contact with the member, which is inserted into the supporting hole (the attachment portion of the measuring instrument or the supporting member for the measuring instrument), when pressing toward the inside of the supporting hole, thereby clamping stably.

It is advisable that the bracket body has: a first portion having the first clamping portion; a second portion having the second clamping portion; and a fine-adjustment system connecting the first portion with the second portion to maintain the attitude of the axes of the supporting holes of the first and second clamping portions in a parallel state to each other, and causing the first portion to displace step by step in the axis direction of the supporting hole with respect to the second portion.

With the above structure, the first portion having the first clamping portion can be displaced step by step in the axial direction of the supporting hole by the fine-adjustment system. In other words, the position of the measuring instrument, such as a dial gauge, which is clamped in the first clamping portion, can be fine-tuned in the direction that the measuring instrument is to measure a thing.

And moreover, where the fine-adjustment system is composed of a pair of plate spring parallel to each other, the position of the measuring instrument, such as the dial gauge, can be adjusted in the measuring direction without changing the attitude of the measuring instrument.

A feature of a stand for supporting a measuring instrument of the present invention is that the second clamping portion of the bracket for clamping the measuring instrument, which has the aforementioned first and second clamping portions, is clamped at a bracket supporting portion of a stand body.

As the structure of the stand body, an articulated type or the like can be selectively used. For example, it is desirable that a stand for a dial gauge has a base, and a pole standing up on the base to clamp the second clamping portion of the bracket for clamping the measuring instrument.

DETAILED DESCRIPTION OF THE PREFERRED EMBODIMENT(S)

The preferred embodiment of the present invention will be explained below with reference to the attached drawings. Incidentally, in the description of the following embodiment, the same reference numerals will be used to designate the same components as those in FIG. 5, so that the description will be omitted or simplified.

Figure 1:
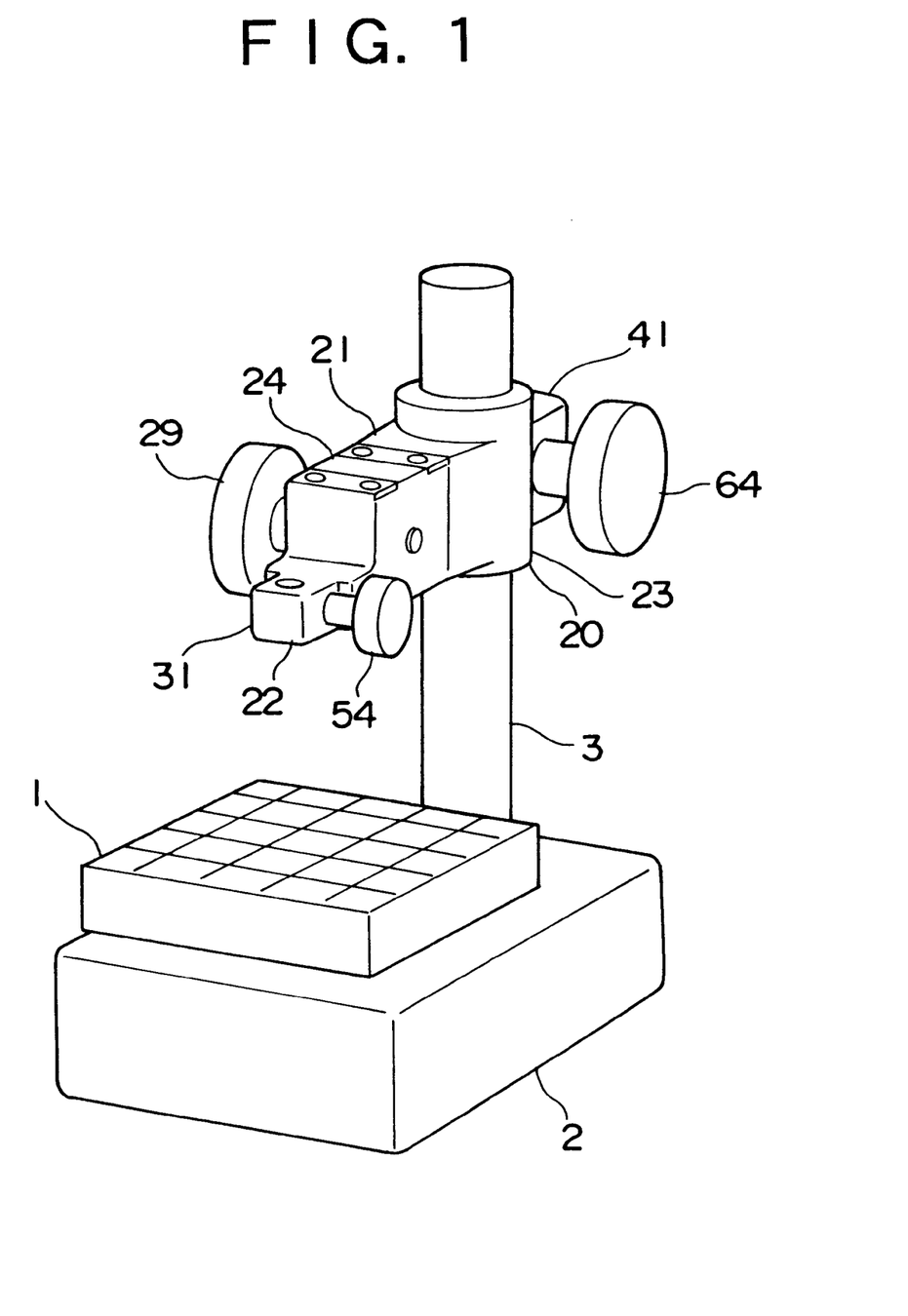
FIG. 1 is a perspective view showing a stand for supporting a measuring instrument of the preferred embodiment according to the present invention.
Figure 2:
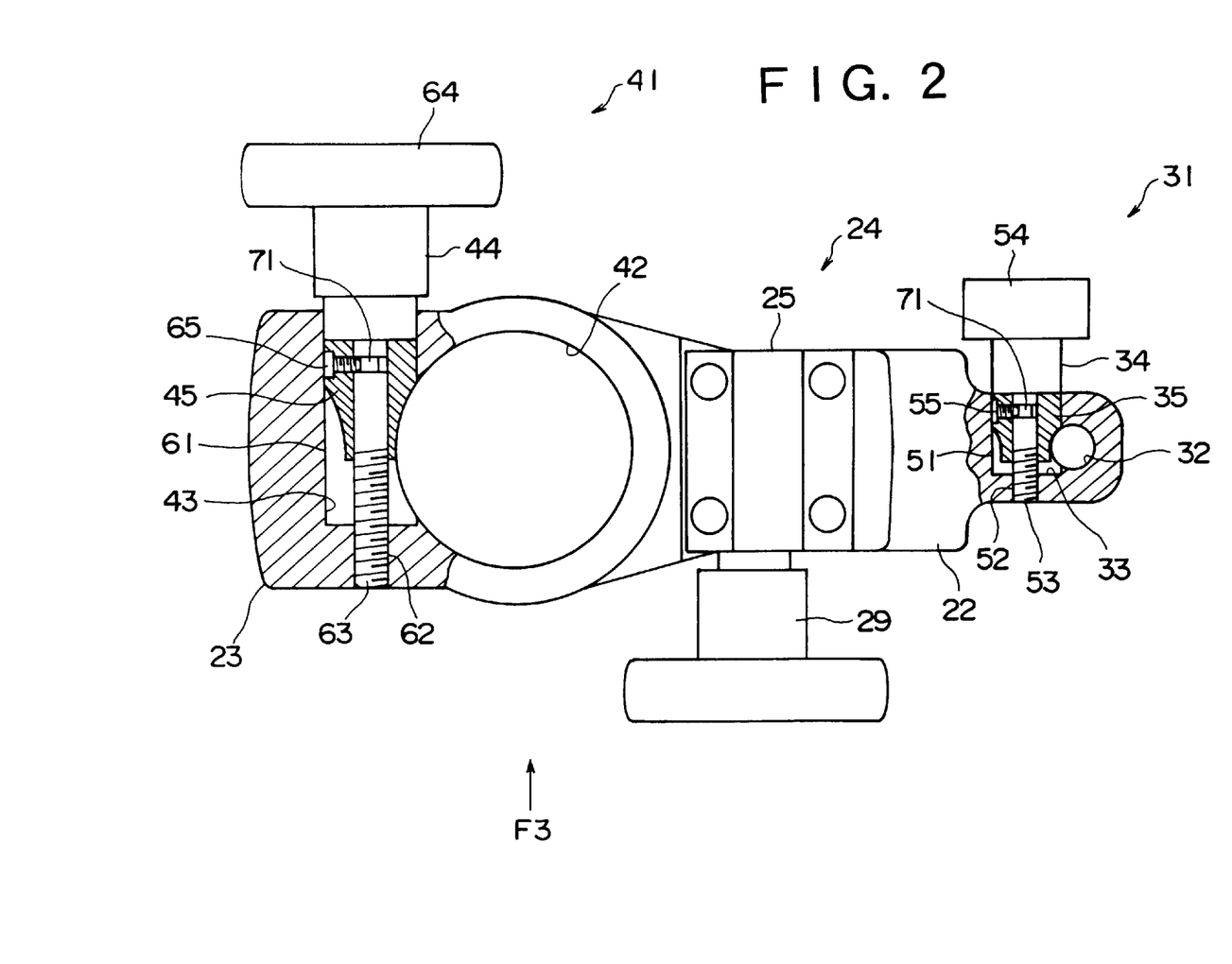
FIG. 2 is a plane cutaway view showing a bracket of the embodiment.
Figure 3:
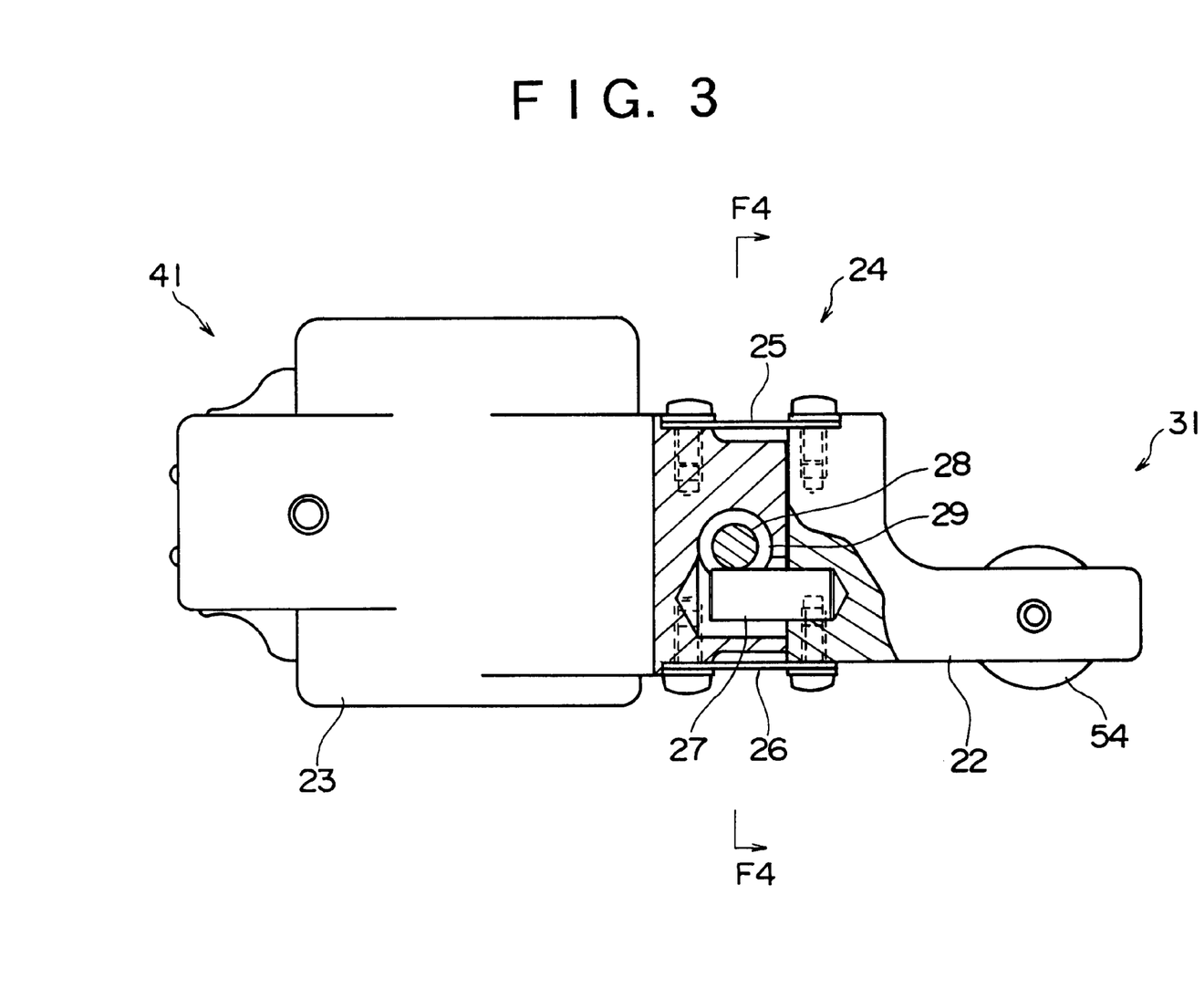
FIG. 3 is a view shown from arrow F3 in FIG. 2.
Figure 4:
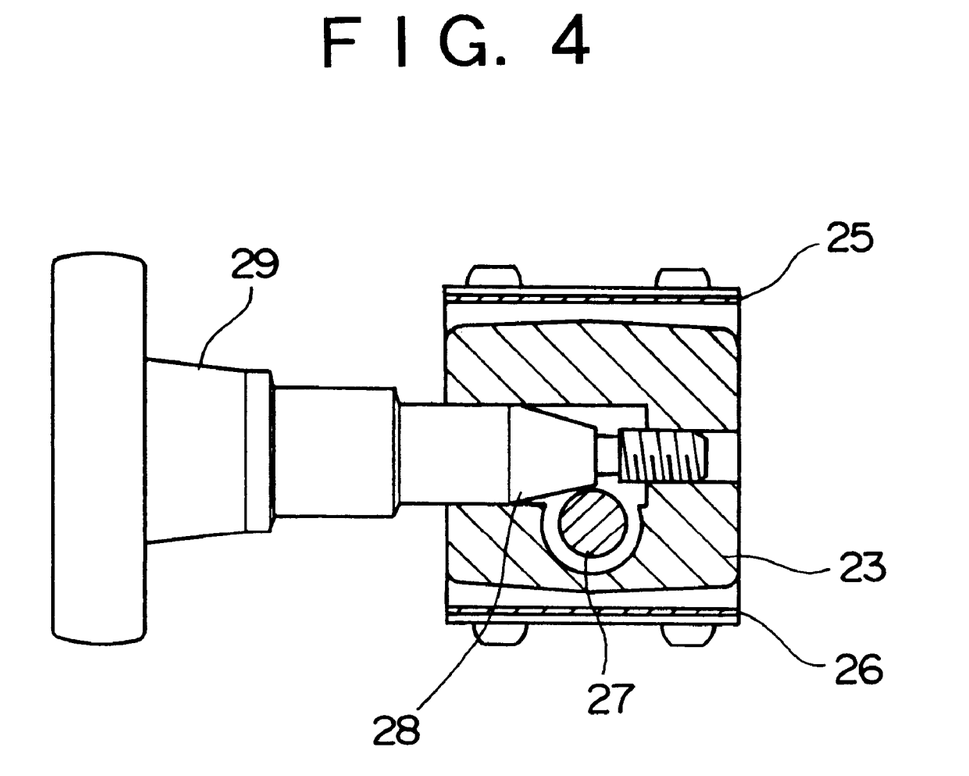
FIG. 4 is a sectional view taken along the F4—F4 line in FIG. 3.

FIG. 1 is a perspective view showing a stand for supporting a measuring instrument of the embodiment. FIG. 2 is a plane cutaway view showing a bracket of the stand. FIG. 3 is a view shown from arrow F3 in FIG. 2. And, FIG. 4 is a sectional view taken along the F4—F4 line in FIG. 3. As shown these drawings, the stand of the embodiment has a different bracket from that of the stand shown in FIG. 5, but has the same base 2 having the measuring area 1 and the same pole 3 standing up on the base 2 as these of the stand shown in FIG. 5. In the embodiment, the stand body is composed of the base 2 and the pole 3 (as a bracket supporting portion).

A bracket 20 of the embodiment is composed of: a bracket body 21; a first clamping portion 31, clamping the stem 4A of the dial gauge 4, provided at one end of the bracket body 21 as an attachment portion for the measuring instrument;

and a second clamping portion 41, clamping the pole 3 of the stand as a supporting member for the measuring instrument, provided at the other end of the bracket body 21.

The bracket body 21, in turn, is composed of: a first portion 22 having the first clamping portion 31; a second portion 23 having the second clamping portion 41; and a fine-adjustment system 24 which connects the first portion 22 with the second portion 23, and causes the first portion 22 to displace step by step for the second portion 23 in the axial direction of the pole 3 (the vertical direction of the pole 3).

The fine-adjustment system 24 is composed of: a pair of plate springs 25 and 26 connecting the first portion 22 with the second portion 23 to displace step by step in the vertical direction of the pole 3 but parallel to the second portion 23; a pin 27 provided in the first portion 22 to project toward the second portion 23; and a fine-adjusting screw 29 which is screwed to the second portion 23 at a right angle to the pin 27, and has a tapered portion 28 pressing the pin 27 downward.

The clamping portions 31 and 41 are respectively composed of: supporting holes 32 and 42 provided in the bracket body 21 to insert the stem 4A of the dial gauge 4 and the pole 3 therein; holes 33 and 43 which are respectively formed adjacent to the supporting holes 32 and 42 to be pierced in a direction perpendicular to the axes of the supporting holes 32 and 42, and have openings toward the insides of the supporting holes 32 and 42 (excepting both the ends) on the middle portion thereof; clamping screws 34 and 44 screwed with the holes 33 and 43; and clamping tops 35 and 45 as the pressing portions, which are pressed toward the inside of the supporting holes 32 and 42 by the movement of the clamping screws 34 and 44 in the axial direction with screwing.

The supporting holes 32 and 42 are respectively formed to have diameters such that the stem 4A of the dial gauge 4 and the pole 3 are inserted therein without any play.

The holes 33 and 43 respectively have larger-diameter sections 51 and 61 which partially open toward the insides of the supporting holes 32 and 42 (parts excepting both the ends), and smaller-diameter sections 52 and 62 having a female screw therein.

The clamping screws 34 and 44 respectively have screw portions 53 and 63 at the ends thereof, which screw with the female screws of the smaller-diameter sections 52 and 62, and adjusting knobs 54 and 64 at the base ends thereof.

The clamping tops 35 and 45 are made separately from the clamping screws 34 and 44 with softer materials, such as brass, than materials of the members inserted into the supporting holes 32 and 42. After that, the clamping tops 35 and 45 are respectively screwed on the middle part of the outer face of the clamping screws 34 and 44 (between the screw portions 53 and 63 and the adjusting knobs 54 and 64) with set-screws 55 and 65. The outer circumferential face of the clamping tops 35 and 45 have rotation-quadric-surfaces which are formed when the circular surfaces of the supporting holes 32 and 42 respectively turn around the axes of the clamping screws 34 and 44.

Next, the usage will be explained.

In using, after the height of the bracket 20 is adjusted along the pole 3, the adjusting knob 64 of the second clamping portion 41 is tightened, whereupon the clamping screw 44 moves in the axial direction, so that the clamping top 45 presses toward the supporting hole 42. Therefore, the pole 3 inserted in the supporting hole 42 is clamped with the clamping top 45. At this time, the diameter of the supporting hole 42 is not changed, so that the positioning relation between the bracket 20 and the pole 3 is not changed easily.

The stem 4A of the dial gauge 4 is inserted into the supporting hole 32 of the first clamping portion 31 of the bracket 20 and the bearing and the height of the dial gauge 4 are adjusted. After that, the adjusting knob 54 is tightened, whereupon the clamping screw 34 moves in the axial direction, so that the clamping top 35 presses toward the supporting hole 32. Therefore, the stem 4A of the dial gauge 4 inserted in the supporting hole 32 is clamped with the clamping top 35. At this time, the diameter of the supporting hole 32 is not changed, so that the positioning relation between the bracket 20 and the stem 4A of the dial gauge 4 is not changed easily.

During the above state, after the spindle 4B of the dial gauge 4 is lifted up once, a referential block is set on the measuring area 1. After that, the spindle 4B is lowered down onto abut the referential block. The dial gauge 4 is moved vertically to set a pointer of the dial gauge 4 at a predetermined figure (normally, zero).

In order to set the pointer, the fine-adjusting screw 29 of the fine-adjustment system 24 is displaced in the axial direction while being screwed. The first portion 22 is displaced in the vertical direction for the second portion 23 by the action of the tapered portion 28 of the fine-adjusting screw 29 and the pin 27, thereby the height of the dial gauge 4, namely, the pointer of the dial gauge 4 meets the predetermined figure. After that, instead of the referential block, a work to be measured is set on the measuring area 1 and the comparative measurement is carried out with the same process.

According to the aforementioned embodiment, the stand is composed of the base 2; the pole 3 standing up on the base 2; and the bracket 20 having the first and second clamping portions 31 and 41. And additionally, the first and second clamping portions 31 and 41 respectively have the supporting holes 32 and 42 which are provided in the bracket body 21 to be inserted therein with the stem 4A of the dial gauge 4 and the pole 3; the clamping screws 34 and 44 which are provided adjacent to the supporting holes 32 and 42 and screwed in a direction perpendicular to the axes of the supporting holes 32 and 42; and the clamping tops 35 and 45 which are pressed toward the supporting holes 32 and 42 by the movement of the clamping screws 34 and 44 in the axial direction with screwing the clamping screws 34 and 44. Therefore, the positioning relation between the bracket 20 and the dial gauge 4, and the positioning relation between the bracket 20 and the pole 3 are not changed easily.

The slot formed in the conventional bracket are not needed to be formed, thereby decreasing the number of producing processes and reducing production costs. Moreover, since the supporting holes 32 and 42 are produced with a high degree of precision by reason of elimination of the slot, the supporting hole does not have play causing a rattle after the clamping process. In addition, tolerance control in the above inserted portions is easily carried out and the appropriate combination is allowed, so that the clamping is securely carried out with small force.

The clamping tops 35 and 45, which are made as parts independent of the clamping screws 34 and 44, are fitted on the outer face of the clamping screws 34 and 44 and screwed with the set-screws 55 and 65. Therefore, the configuration and size of the clamping tops 35 and 45 can be appropriately selected in correspondence to the size of the supporting holes 32 and 42.

At this point, since the outer faces of the clamping tops 35 and 45 have a rotation-quadric-surface which is formed when the circular face of the supporting hole 32 or 42 turn around the axis of the clamping screw 34 or 44, the clamping tops 35 and 45 respectively get linear-contact with members (the stem 4A of the dial gauge 4 and the pole 3) inserted into the supporting holes 32 and 42 when the clamping tops are pressed toward the supporting holes 32 and 42, thereby stably clamping. It should be considered that any member is damaged by the linear-contact, but in the embodiment, the clamping tops 35 and 45 are made of soft materials, such as brass, so that the above concern is not shown.

The bracket body 21 is composed of the first portion 22 having the first clamping portion 31; the second portion 23 having the second clamping portion 41; the fine-adjustment system 24 which causes the first portion 22 to displace step by step in the axial direction of the pole 3 (the vertical direction of the pole 3) with respect to the second portion 23. Therefore, the first portion 22 having the first clamping portion 31 can be displaced in the vertical direction of the pole 3 by the fine-adjustment system 24. In other words, the position of the dial gauge 4 which is clamped in the first clamping portion 31 can be fine-tuned in the vertical direction. Moreover, the fine-adjustment system 24 is composed of a pair of plane springs 25 and 26 on a parallel with each other, so that the dial gauge 4 can be fine-tuned in the vertical direction although the attitude of the dial gauge 4 is not changed.

In the embodiment, the clamping tops 35 and 45 are made separately from the clamping screws 34 and 44 and respectively screwed on the outer circumferential face of the clamping screws 34 and 44 with the set-screws 55 and 65. However, it is not limited to the above manner.

For example, the clamping tops 35 and 45 may respectively be able to rotate with respect to the clamping screws 34 and 44 and be under control of the movement in the axial direction, in other words, may be provided not to move in the axial direction. More specifically, if a groove 71 is formed at some midpoints of the clamping screws 34 and 44 (see FIG. 2) to be engaged with the ends of the set-screws 55 and 65, the groove 71 controls the movement of the clamping tops 35 and 45 in the axial direction (the axial direction of the clamping screws 34 and 44), and additionally, it allows the clamping tops 35 and 45 to rotate around the clamping screws 34 and 44. Thereby, even when the clamping screws 34 and 44 rotate, the clamping tops 35 and 45 are not rotated, so that the clamping tops 35 and 45 are left to press the dial gauge 4 and the pole 3 without sliding.

The aforementioned pressing portion can be provided to protrude inward and draw back from the supporting holes 32 and 42, and additionally, the tapered portion abutting the pressing portion can be formed at some midpoint of the clamping screws 34 and 44. Thereby, the pressing portion abutted to the tapered portion may presses toward the supporting holes 32 and 42 when the clamping screws 34 and 44 are moved in the axial direction by being screwed. Alternatively, a bulging portion, having a larger diameter than these of other parts, can be formed at some midpoint of the clamping screws 34 and 44 to be pressed toward the supporting holes 32 and 42 by the movement of the clamping screws 34 and 44 in the axial direction with screwing the clamping screws 34 and 44.

In the aforementioned embodiment, the stand body is composed of the base 2 and the pole 3, but it can be structured as an articulated type. Only the stand type as described thus far is not applied, that is to say the structure and the model are selectively decided insofar as it is a supporting member for the measuring instrument which supports the measuring instrument in the proper attitude.

The bracket body 21 is provided with the first clamping portion 31 and the second clamping portion 41 in the aforementioned embodiment, but, for example, the second clamping portion 41 can be omitted and the bracket body 21 can be formed in combination with the supporting member for the measuring instrument. In other words, the first clamping portion 31 may be only formed.

According to the bracket for clamping the measuring instrument and the stand for supporting the measuring instrument of the present invention, the measuring instrument is rarely deviated from the proper position when being clamped, and any play causing a rattle is not produced, and moreover, it can be produced at small cost.

What is claimed is:

1. A bracket for clamping a measuring instrument having an attachment portion, the bracket comprising:

a bracket body including a clamping portion for clamping the attachment portion of the measuring instrument in the bracket body, wherein said clamping portion includes a supporting hole extending along an axis and through the bracket body, a clamping hole extending into the clamping portion perpendicularly to the axis along a clamping screw axis and being in communication with the supporting hole interiorly of the clamping portion at a peripheral portion of the supporting hole, a clamping screw movably disposed in the clamping hole and a pressing portion connected to the clamping screw and disposed in the clamping hole, the pressing portion operative to move into the supporting hole to clamp the attachment portion as the clamping screw moves in a first direction and to move out of the supporting hole to unclamp the attachment portion as the clamping screw moves in a second direction opposite the first direction.

2. The bracket for clamping the measuring instrument according to claim 1, wherein said pressing portion has a clamping top provided on an outer circumferential face of said clamping screw.

3. The bracket for clamping the measuring instrument according to claim 2, wherein said clamping top is made separately from said clamping screw and provided to rotate around said clamping screw but not to move in an axial direction.

4. The bracket for clamping the measuring instrument according to claim 3, wherein an outer circumferential face of said clamping top has a rotation-quadric-surface formed when a circular face of said supporting hole turns around the axis of said clamping screw.

5. A bracket for clamping a measuring instrument to a support member, the measuring instrument having an attachment portion, the bracket comprising:

a bracket body including a first clamping portion and a second clamping portion, the first clamping portion for clamping the attachment portion of the measuring instrument and the second clamping portion for clamping the supporting member, wherein said first clamping portion includes a first supporting hole extending along a first axis and through the bracket body, a first clamping hole extending into the first clamping portion perpendicularly to the first axis along a first clamping screw axis and being in communication with the first supporting hole interiorly of the first clamping portion at a first peripheral portion of the first supporting hole, a first clamping screw movably disposed in the first clamping hole and a first pressing portion connected to the first clamping screw and disposed in the first clamping hole, the first pressing portion operative to move into the first supporting hole to clamp the attachment portion as the first clamping screw moves in a first direction and to move out of the first supporting hole to unclamp the attachment portion as the first clamping screw moves in a second direction opposite the first direction; and wherein said second clamping portion includes a second supporting hole extending along a second axis and through the bracket body, a second clamping hole extending into the second clamping portion perpendicularly to the second axis along a second clamping screw axis and being in communication with the second supporting hole interiorly of the second clamping portion at a second peripheral portion of the second supporting hole, a second clamping screw movably disposed in the second clamping hole and a second pressing portion connected to the second clamping screw and disposed in the second clamping hole, the second pressing portion operative to move into the second supporting hole to clamp the support member as the second clamping screw moves in a third direction and to move out of the second supporting hole to unclamp the support member as the second clamping screw moves in a fourth direction opposite the third direction.

6. The bracket for clamping the measuring instrument according to claim 5, wherein each of said first and second pressing portions has a clamping top provided on an outer circumferential face of respective ones of said first and second clamping screws.

7. The bracket for clamping the measuring instrument according to claim 6, wherein said clamping top is made separately from a respective one of said clamping screws and provided to rotate around the respective one of said first and second clamping screws but not to move in the axial direction.

8. The bracket for clamping the measuring instrument according to claim 7, wherein an outer circumferential face of said clamping top has a rotation-quadric-surface formed when a circular face of a respective one of said first and second supporting holes turns around the axis of said clamping screw.

9. The bracket for clamping the measuring instrument according to claim 8, wherein said bracket body has a first portion having said first clamping portion, a second portion having said second clamping portion, and a fine-adjustment system connecting the first portion with the second portion to maintain the attitude of the first and second axes of said first and second supporting holes in a parallel state relative to each other, and causing the first portion to displace step by step in the first axis direction of said first supporting hole with respect to the second portion.

10. The bracket for clamping the measuring instrument according to claim 9, wherein said fine-adjustment system has a pair of plate springs connecting the first portion with the second portion to displace in the first axis direction of said first supporting hole in parallel to the second portion, a pin provided in the first portion to project toward the second portion, and a fine-adjusting screw screwed in the second portion at a right angle to the pin, and having a tapered portion pressing the pin downward.

11. A stand for supporting a measuring instrument having an attachment portion, the stand comprising:
a stand body having a bracket supporting portion; and a bracket body having a first clamping portion and a second clamping portion, wherein the first clamping portion includes:
a first supporting hole extending along a first axis and through the bracket body, a first clamping hole extending into the first clamping portion perpendicularly to the first axis along a first clamping screw axis and being in communication with the first supporting hole interiorly of the first clamping portion at a first peripheral portion of the first supporting hole, a first clamping screw movably disposed in the first clamping hole and a first pressing portion connected to the first clamping screw and disposed in the first clamping hole, the first pressing portion operative to move into the first supporting hole to clamp the attachment portion as the first clamping screw moves in a first direction and to move out of the first supporting hole to unclamp the attachment portion as the first clamping screw moves in a second direction opposite the first direction; and wherein the second clamping portion includes:
a second supporting hole extending along a second axis and through the bracket body, a second clamping hole extending into the second clamping portion perpendicularly to the second axis along a second clamping screw axis and being in communication with the second supporting hole interiorly of the second clamping portion at a second peripheral portion of the second supporting hole, a second clamping screw movably disposed in the second clamping hole and a second pressing portion connected to the second clamping screw and disposed in the second clamping hole, the second pressing portion operative to move into the second supporting hole to clamp the bracket supporting portion as the second clamping screw moves in a third direction and to move out of the second supporting hole to unclamp the bracket supporting portion as the second clamping screw moves in a fourth direction opposite the third direction.

12. The stand for supporting the measuring instrument according to claim 11, wherein said stand body has a base, and a pole standing up on the base to clamp said second clamping portion of said bracket for clamping the measuring instrument.

13. The stand for supporting the measuring instrument according to claim 12, wherein each of said pressing portions of the bracket for clamping the measuring instrument has a clamping top provided on an outer circumferential face of a respective one of said first and second clamping screws.

14. The stand for supporting the measuring instrument according to claim 13, wherein said clamping top is made separately from a respective one of said first and second clamping screws and provided to rotate around the respective one of said first and second clamping screws but not to move in the axial direction.

15. The stand for supporting the measuring instrument according to claim 14, wherein an outer circumferential face of said clamping top has a rotation-quadric-surface formed when a circular face of a respective one of the first and second supporting holes turns around the axis of said clamping screw.

16. The stand for supporting the measuring instrument according to claim 15, wherein said bracket body of the bracket for clamping the measuring instrument has a first portion having a first clamping portion, a second portion having said second clamping portion, and a fine-adjustment system connecting the first portion with the second portion to maintain the attitude of the first and second axes of said first and second supporting holes in a parallel state relative to each other, and causing the first portion to displace step by step in the first axis direction of said first supporting hole with respect to the second portion.

17. The stand for supporting the measuring instrument according to claim 16, wherein said fine-adjustment system has a pair of plate springs connecting the first portion with the second portion to displace in first axis direction of said first supporting hole in parallel to the second portion, a pin provided in the first portion to project toward the second portion, and a fine-adjusting screw screwed in the second portion at a right angle to the pin, and having a tapered portion pressing the pin downward.

* * * * *